US006025017A

United States Patent [19]
Roth

[11] Patent Number: 6,025,017
[45] Date of Patent: Feb. 15, 2000

[54] PHOTOPOLYMERIZABLE COATING FORMULATION FOR THERMAL TRANSFER MEDIA

[75] Inventor: Joseph D. Roth, Springboro, Ohio

[73] Assignee: NCR Corporation, Dayton, Ohio

[21] Appl. No.: 08/859,903

[22] Filed: May 21, 1997

[51] Int. Cl.[7] ................................ B41M 3/12; C08F 2/46

[52] U.S. Cl. ................................ 427/146; 522/6; 522/7; 522/25; 522/26; 522/64; 522/65; 522/74; 522/82; 522/27; 522/28; 522/30; 522/32; 428/413; 428/500; 428/908; 428/914; 427/148

[58] Field of Search .............................. 522/6, 7, 25, 26, 522/27, 30, 32, 28, 64, 65, 74, 82; 428/413, 500, 908, 914; 427/146, 148

[56] References Cited

U.S. PATENT DOCUMENTS

| | | | |
|---|---|---|---|
| 3,663,278 | 5/1972 | Blose et al. | 117/234 |
| 4,258,367 | 3/1981 | Mansukhani | 346/1.1 |
| 4,315,643 | 2/1982 | Tokunaga et al. | 282/27.5 |
| 4,403,224 | 9/1983 | Wirnowski | 346/1.1 |
| 4,463,034 | 7/1984 | Tokunaga et al. | 427/256 |
| 4,628,000 | 12/1986 | Talvalkar et al. | 428/341 |
| 4,680,368 | 7/1987 | Nakamoto et al. | 528/49 |
| 4,687,701 | 8/1987 | Knirsch et al. | 428/216 |
| 4,707,395 | 11/1987 | Ueyama et al. | 428/212 |
| 4,777,079 | 10/1988 | Nagamoto et al. | 428/212 |
| 4,778,729 | 10/1988 | Mizobuchi | 428/484 |
| 4,923,749 | 5/1990 | Talvalkar | 428/341 |
| 4,950,696 | 8/1990 | Palazotto et al. | 522/25 |
| 4,975,332 | 12/1990 | Shini et al. | 428/500 |
| 4,983,446 | 1/1991 | Taniguchi et al. | 428/216 |
| 4,988,563 | 1/1991 | Wehr | 428/341 |
| 5,128,308 | 7/1992 | Talvalkar | 503/201 |
| 5,200,438 | 4/1993 | Fujii et al. | 522/96 |
| 5,240,781 | 8/1993 | Obata et al. | 428/488.4 |
| 5,248,652 | 9/1993 | Talvalkar | 503/201 |
| 5,270,368 | 12/1993 | Lent et al. | 524/236 |
| 5,348,348 | 9/1994 | Hanada et al. | 283/91 |
| 5,391,685 | 2/1995 | Hitomi et al. | 528/75 |
| 5,437,964 | 8/1995 | Lapin et al. | 430/280 |
| 5,500,040 | 3/1996 | Fujinami | 106/21 |

FOREIGN PATENT DOCUMENTS

| | | |
|---|---|---|
| 0111004 | 6/1984 | European Pat. Off. . |
| 0206672 | 12/1986 | European Pat. Off. . |
| 2199670 | 7/1988 | United Kingdom . |
| 9720696 | 6/1997 | WIPO . |

OTHER PUBLICATIONS

K. K. Dietliker, "Chemistry & Technology of UV & EB Formulation for Coatings, Inks & Paints", vol. 3, Selective Industrial Training Associates Ltd., London, U.K. (1991), pp. 275–298.

Ciba Geigy, "Radiation Curing of Polymers", The Royal Society of Chemistry, 1987, pp. 184–207.

*Primary Examiner*—Samuel A. Acquah
*Attorney, Agent, or Firm*—Millen White Zelano & Branigan, P.C.

[57] ABSTRACT

A coating formulation suitable for use in preparing thermal transfer ribbons is provided which is curable by UV radiation or visible light. The coating formulation forms thermal transfer layers that produce printed images when used in a thermal transfer printer. The coating formulation comprises a photoreactive monomer or oligomer, a photoinitiator and a sensible material. Also provided are printers which use these ribbons and processes for preparing them.

38 Claims, No Drawings

PHOTOPOLYMERIZABLE COATING FORMULATION FOR THERMAL TRANSFER MEDIA

FIELD OF THE INVENTION

The present invention relates to thermal transfer printing wherein images are formed on a receiving substrate by heating extremely precise areas of a print ribbon with thin film resistors. This heating of the localized area causes transfer of ink or other sensible material from the ribbon to the receiving substrate. The sensible material is typically a pigment or dye which can be detected visually, optically or magnetically.

BACKGROUND OF THE INVENTION

Thermal transfer printing has displaced impact printing in many applications due to advantages such as relatively low noise levels and high reliability which are attained during the printing operation. Thermal transfer printing is widely used in special applications such as in the printing of machine-readable bar codes and magnetic alpha-numeric characters. The thermal transfer process provides great flexibility in generating images and allows for broad variations in style, size and color of the printed image. Thermal transfer printing requires a special medium for transferring ink or other sensible material to a receiving substrate. This special medium, referred to herein as a "thermal transfer medium," typically comprises a functional layer on a substrate. The functional layer, also referred to as a "thermal transfer layer," contains the ink or sensible material that is transferred upon application of heat from a thermal print head. The thermal transfer layer comprises a mixture of components which vary significantly in identity and concentration, depending on the end use. Representative documentation in the areas of thermal transfer printing and coating formulations for thermal transfer layers include the following:

U.S. Pat. No. 3,663,278, issued to J. H. Blose et al. on May 16, 1972, discloses a thermal transfer medium comprising a base with a coating comprising of cellulosic polymer, thermoplastic aminotriazine-sulfonamide-aldehyde resin, plasticizer and a "sensible" material such as a dye or pigment.

U.S. Pat. No. 4,315,643, issued to Y. Tokunaga et al. on Feb. 16, 1982, discloses a thermal transfer element comprising a foundation, a color developing layer and a hot melt ink layer. The ink layer includes heat conductive material and a solid wax as a binder material.

U.S. Pat. No. 4,403,224, issued to R. C. Winowski on Sep. 6, 1983, discloses a surface recording layer comprising a resin binder, a pigment dispersed in the binder, and a smudge inhibitor incorporated into and dispersed throughout the surface recording layer, or applied to the surface recording layer as a separate coating.

U.S. Pat. No. 4,463,034, issued to Y. Tokunaga et al. on Jul. 31, 1984, discloses a heat-sensitive magnetic transfer element having a hot melt or a solvent coating.

U.S. Pat. No. 4,628,000, issued to S. G. Talvalkar et al. on Dec. 9, 1986, discloses a thermal transfer formulation that includes an adhesive-plasticizer or sucrose benzoate transfer agent and a coloring material or pigment.

U.S. Pat. No. 4,687,701, issued to K. Knirsch et al. on Aug. 18, 1987, discloses a heat sensitive inked element using a blend of thermoplastic resins and waxes.

U.S. Pat. No. 4,707,395, issued to S. Ueyama et al., on Nov. 17, 1987, discloses a substrate, a heat-sensitive releasing layer, a coloring agent layer, and a heat-sensitive cohesive layer.

U.S. Pat. No. 4,777,079, issued to M. Nagamoto et al. on Oct. 11, 1988, discloses an image transfer type thermosensitive recording medium using thermosoftening resins and a coloring agent.

U.S. Pat. No. 4,778,729, issued to A. Mizobuchi on Oct. 18, 1988, discloses a heat transfer sheet comprising a hot melt ink layer on one surface of a film and a filling layer laminated on the ink layer.

U.S. Pat. No. 4,923,749, issued to Talvalkar on May 8, 1990, discloses a thermal transfer ribbon which comprises two layers, a thermosensitive layer and a protective layer, both of which are water based.

U.S. Pat. No. 4,975,332, issued to Shini et al. on Dec. 4, 1990, discloses a recording medium for transfer printing comprising a base film, an adhesiveness improving layer, an electrically resistant layer and a heat sensitive transfer ink layer.

U.S. Pat. No. 4,983,446, issued to Taniguchi et al. on Jan. 8, 1991, describes a thermal image transfer recording medium which comprises as a main component, a saturated linear polyester resin.

U.S. Pat. No. 4,988,563, issued to Wehr on Jan. 29, 1991, discloses a thermal transfer ribbon having a thermal sensitive coating and a protective coating. The protective coating is a wax-copolymer mixture which reduces ribbon offset.

U.S. Pat. Nos. 5,128,308 and 5,248,652, issued to Talvalkar, each disclose a thermal transfer ribbon having a reactive dye which generates color when exposed to heat from a thermal transfer printer.

And, U.S. Pat. No. 5,240,781, issued to Obata et al., discloses an ink ribbon for thermal transfer printers having a thermal transfer layer comprising a wax-like substance as a main component and a thermoplastic adhesive layer having a film forming property.

To be suitable for thermal transfer printing, there are many requirements placed on the thermal transfer layers and coating formulations which produce them. For example, the properties of the thermal transfer layer must permit transfer from a carrier to a receiving substrate and provide a stable, preferably permanent image. The properties needed to meet these requirements are in conflict and require a mixture of components to address both needs, typically a wax to provide softening characteristics for transfer and a thermoplastic polymer resin to provide stability and resistance to handling of the image after transfer. Conventional thermal transfer (coating) formulations have employed organic solvents to solubilize or emulsify the dry components for deposition on a substrate. The use of organic solvents complicates compliance with environmental regulations and restrictions. The use of solvent also adds to the cost in that the solvent is removed from the coating and captured or incinerated.

Water-based and water-rich coating formulations have recently been developed to improve safety, reduce costs, and simplify compliance with environmental regulations and restrictions. For example, U.S. Pat. No. 4,923,749 issued to Talvalkar, discloses a thermal transfer ribbon which comprises a thermal sensitive layer and protective layer, both of which are water-based. Extensive work has been done to develop water-rich systems to replace organic solvent-based systems. In these formulations, both the waxes and resins must be soluble, dispersible or emulsifiable in water, which limits the selection. Suitable waxes and resins are available in separate aqueous emulsions. However, in preparing a water-rich/water-based coating formulation, the selection of components is further limited in that it is necessary to find a wax emulsion which is compatible with the resin emulsion to avoid precipitation. To achieve some combinations it is necessary to incorporate organic solvents to prevent precipitation of the polymer resin.

Alternatives to using solvent are hot melt techniques wherein a solid coating formulation is melted, applied to a substrate, and chilled to resolidify the formulation. These hot melt techniques are not well suited for multilayer techniques in that the first layer (subcoat) can be compromised when a second layer (top coat) is applied at high temperatures.

It is desirable to prepare thermal transfer layers from a coating formulation which does not require any solvent, whether aqueous or organic, and does not require the high temperatures of hot melt techniques for application to a substrate.

Ultraviolet radiation curable inks are known and most comprise a reactive oligomer, a reactive monomer, a photoinitiator, a pigment and optional additives. UV curable inks are commonly used in printing methods other than thermal transfer printing, such as screen printing, and lithography techniques for printed circuit boards, examples being described in U.S. Pat. Nos. 5,200,438, 5,391,685, 5,270,368, 4,680,368 and 5,500,040. A UV curable ink said to be suitable for ink jet printing is described in U.S. Pat. No. 4,258,367. Conventional UV curable inks typically do not have the transfer properties necessary for use in conventional thermal transfer printing processes with conventional thermal transfer printers after cure. They are typically formulated for use in printing methods wherein curing provides a permanent image.

SUMMARY OF THE INVENTION

The general objective of this invention is the simplification and improvement of methods for preparing thermal transfer media used in thermal transfer printing.

A specific object of this invention is to provide a coating formulation for the preparation of thermal transfer media which does not require the removal of an aqueous or organic solvent to form a coating and does not require high temperatures to form a coating.

Another object of this invention is to provide a coating formulation which forms thermal transfer layers for a thermal transfer medium by a UV or visible light initiated reaction.

An additional object of the present invention is to provide a coating formulation which contains a reactive carrier that polymerizes when exposed to UV or visible light.

A further object of the present invention is to provide a thermal transfer medium which contains UV or visible light cured polymers as a binder within its thermal transfer layer.

Yet another object of the present invention is to provide a method for preparing thermal transfer media wherein the thermal transfer coating is formed by photopolymerization without the removal of solvent and without the use of high temperatures (above 275 C).

An additional object of the present invention is to provide a thermal transfer printer which incorporates a thermal transfer ribbon of the present invention.

The above objects are achieved by the coating formulations and thermal transfer media of the present invention. The coating formulation of the present invention eliminates the need for solvent through the use of an ultraviolet light or visible light curing carrier. The carrier either suspends, emulsifies or solubilizes the formulation components such as the sensible material, a photoinitiator which initiates polymerization within the formulation and optionally other binder components such as one or more waxes and/or one or more thermoplastic resins. The ultraviolet light or visible light curing carrier comprises at least one photopolymerizable monomer or oligomer, preferably selected from epoxy monomers and vinyl ether monomers.

The thermal transfer medium of the present invention comprises a supporting substrate and a thermal transfer layer deposited thereon. This thermal transfer layer comprises a sensible material and a binder for said sensible material. This binder comprises at least one polymer obtained by UV or visible light initiated cure of a photopolymerizable monomer or oligomer. The thermal transfer printer of the present invention incorporates such a thermal transfer medium.

The method for preparing thermal transfer media provided by this invention comprises applying a coating formulation of the present invention to a substrate and exposing the coating formulation to UV or visible light to polymerize the photopolymerizable components therein.

The photopolymerizable monomers and oligomers suitable for use in the coating formulation of the present invention include those which cure by a cationic mechanism and those which cure by a free-radical mechanism. Photopolymerizable monomers and oligomers which cure by a cationic curing mechanism instead of a free-radical curing mechanism are preferred. The cationic curing mechanism provides the following advantages:

(1) The polymerization is typically uninhibited by oxygen, unlike free-radical cures.

(2) The polymerization typically has no volatile by-products which can represent health hazards and/or produce an unpleasant odor.

(3) The polymerization, once activated, typically continues for some time in the absence of light (dark cure).

(4) All of the polymerization medium (coating formulation) can typically be used to make the final thermal transfer layer. No solvents need be evaporated after application of the coating formulation to the supporting substrate.

(5) The polymerization medium is very stable in the absence of light and typically can have a shelf-life of years if stored in a light-free environment.

The use of coating formulations with a UV/visible light curing carrier has several advantages when compared to solvent or aqueous based coatings and inks. For example, there is no need to dry the coating applied to the supporting substrate and capture/incinerate any organic solvents. In addition, the polymerized monomers/oligomers form a portion of and sometimes all of the binder for the sensible material within the thermal transfer layer.

The coating formulation comprises a sensible material, a photoinitiator, and at least one photopolymerizable monomer or oligomer and may optionally contain an additional binder material selected from waxes and thermoplastic resins. These additional binder components may or may not be reactive. The components are typically mixed and passed through an attritor to form a common dispersion or emulsion or separate dispersions/emulsions of the components are prepared and then combined. The coating formulation is then applied to a supporting substrate, such as polyethylene terephthalate film, and exposed to UV or visible light to initiate polymerization of the monomers and oligomers. This polymerization reaction turns the liquid coating formulation into a solid thermal transfer layer. Driers are not required to remove solvent or other volatiles and all of the coating formulation applied to the supporting substrate becomes part of the thermal transfer layer. This method can be preformed at ambient temperature allowing multiple layer ribbons to be produced.

DETAILED DESCRIPTION OF THE INVENTION

The ultraviolet radiation or visible light curing coating formulation of this invention may generally be comprised of the following components:

(1) one or more photopolymerizable monomers and/or oligomers;

(2) at least one photoinitiator; and (3) at least one sensible material.

Optional materials which are most preferred include an additional binder component selected from waxes and thermoplastic resins. Other optional materials, which are preferred, include one or more alcohols selected from mono-functional and multi-functional alcohols. Other optional materials include photosensitizers and performance additives such as emulsifiers/dispersants for the components and plasticizers.

The coating formulations of the present invention contain at least one sensible material which is capable of being sensed visually, by optical means, by magnetic means, by electroconductive means or by photoelectric means. This sensible material is typically a coloring agent or magnetic pigment. The coloring agents include a variety of organic and inorganic coloring pigments and dyes. Examples include phthalocyanine dyes, carbon blacks, fluorescent naphthalimide dyes and others such as cadmium, primrose, chrome yellow, ultra marine blue, iron oxide, zinc oxide, titanium oxide, cobalt oxide, nickel oxide, etc. Other examples of coloring agents include those described in U.S. Pat. No. 3,663,278 and U.S. Pat. No. 4,923,749. Reactive dyes such as leuco dyes and diazonium compounds are also suitable. Less common sensible materials include photochromic compounds, conductive polymers and fluorescent pigments. The total amount of sensible material is preferably from about 0.5–25 wt. %, most preferably about 5–10 wt. %, of the total coating formulation. Dispersing agents may optionally be used in the coating formulation to help solubilize the pigment or dye.

The starting of any photochemical reaction is the absorption of a photon by a compound which promotes it to an excited state, followed by the decomposition of the compound to a highly reactive entity. Compounds which ultimately form protic acids or Br nsted-Lawry acids upon exposure to UV and/or visible light sufficient to initiate cationic polymerization are suitable for use as photoinitiators in this invention. Such compounds are commonly referred to as cationic photoinitiators. Most cationic UV photoinitiators absorb photon energy at a wavelength in the range of 360–450 nm. Compounds which form reactive free radicals upon exposure to UV and/or visible light sufficient to initiate free-radical polymerization are also suitable for use as photoinitiators in this invention. Such compounds are commonly referred to as free-radical photoinitiators. Both free-radical photoinitiators and cationic photoinitiators are well known and conventional photoinitiators such as those listed below are suitable for use in this invention.

| Structure | Trade Name | Supplier |
|---|---|---|
| Benzoin | Esacure BO | Fratelli Lamberti |
| | (2-hydroxy-1,2-diphenylethanone) | |
| Benzoin ethyl ether | Daitocure EE | Siber Hegner |
| | (2-Ethoxy-1,2-diphenylethanone) | |
| Benzoin isopropyl ether | Vicure 30 | Stauffer |
| | Daitocure IP | Siber Hegner |
| | 2-Isopropoxy-1,2-diphenylethanone) | |
| Benzoin n-butyl ether | Esacure EB1 | Fratelli Lamberti |
| | (2-Butoxy-1,2-diphenylethanone) | |
| Mixture of benzoin butyl ethers | Trigonal 14 | Akzo |
| Benzoin iso-butyl ether | Vicure 10 | Stauffer |
| | Esacure EB2 | Fratelli Lamberti |
| | Daitocure IB | Siber Hegner |
| | (2-Isobutoxy-1,2-diphenylethanone) | |
| Blend of benzoin n-butyl ether and benzoin isobutyl ether | Esacure EB3 Fratelli Lamberti Ercure EB4 | |
| Benzildimethyl ketal (BDK) | Irgacure 651 | Ciba-Geigy |
| | Lucirin BDK | BASF |
| | Esacure KB1 | Fratelli Lamberti |
| | Esacure KB60 (60% solution in methylene chloride) | Fratelli Lamberti |
| | Micure 3K-6 | Miwon |
| | Hicure BDK | Kawaguchi |
| | (2,2-Dimethoxy-1,2-diphenylethanone) | |
| 2,2-Diethoxy-1,2-diphenylethanone | Ulvatone 8302 | Upjohn |
| ,-Diethoxyacetophenone | DEAP | Upjohn |
| | DEAP | Rahn |
| | (2,2-Diethoxy-1-phenyl-ethanone) | |
| ,-Di-(n-butoxy)-acetophenone | Uvatone 8301 | Upjohn |
| | (2,2-Dibutoxyl-1-phenyl-ethanone) | |
| 1-Hydroxy-cyclohexyl-phenyl keton (HCPK) | Irgacure 184 | Ciba-Geigy |
| ,-dimethoxy- -hydroxy acetophenone | Darocur 1173 (from 1.1.92 Ciba-Geigy) | Merck |
| | Micure HP-8 | Miwon |
| | (2-Hydroxy-2-methyl-1-phenyl-propan-1-one) | |
| 1-(4-Isopropylphenyl)-2-hydroxy-2-methyl-propan-1-one | Darocur 1116 (from 1.1.92 Ciba-Geigy) | Merck |
| 1-[4-(2-Hydroxyethoxy)phenyl]-2-hydroxy-2-methylpropan-1-one | Darocur 2959 (from 1.1.92 Ciba-Geigy) | Merck |
| 1:1 mixture | Irgacure 500 | Ciba-Geigy |
| | Blend of 1-hydroxy-cyclohexyl-phenyl ketone and benzophenone | |
| and other benzophenone derivatives | Darocur 4665 (from 1.1.92 Ciba-Geigy | Merck |
| | Blend of 2-hydroxy-2-methyl-1-phenyl-propan-1-one and benzophenone | |
| | Darocur 1664 (from 1.1.92 Ciba-Geigy) | Merck |
| | Blend of 2-hydroxy-2-methyl-1-phenyl-propan-1-one and 2-isopropyl thioxanthone) | |
| | Darocur 4043 (from 1.1.92 Ciba-Geigy) | Merck |
| | Blend of 2-hydroxy-2-methyl-1-phenyl-propan-1-one 2-isopropyl-thioxanthone and 1-(4-dimethylaminophenyl)-ethanone | |
| 2-Methyl-1-[4-(methylthio)-phenyl]-2-morpholino-propan-1-one | Irgacure 907 | Ciba-Geigy |
| 2-Benzyl-2-dimethylamino-1-(4-morpholinophenyl)-butan-1-one | Irgacure 369 | Ciba-Geigy |
| 3,6-Bis(2-methyl-2-morpholino-propanonyl)-9-butyl-carbazole | Florcure A-3 | Floridienne |

-continued

| | | |
|---|---|---|
| 75% solution in tripropylene-glycoldiacrylate) | Esacure KIP | Fratelli Lamberti |
| Poly[2-hydroxy-2-methyl-1-[4-(1-methylvinyl)phenyl]propan-1-one | | |
| 2,4,6-Trimethylbenzoyl-diphenyl-phosphine oxide | Lucirin TPO | BASF |
| Blends of 2,4,6-Trimethylbenzoyl-diphenylphosphine oxide and 2-hydroxy-2-methyl-1-phenyl-propan-1-one | Darocur 4263 (15:85 mixture) Darocur 4265 (50:50 mixture) | Merck (from 1.1.92 Ciba-Geigy) |
| 2,2,2,-Trichloro-1-[4-(1,1-dimethylethyl)phenyl]ethanone | Trigonal P1 | Akzo |
| 2,2-Dichloro-1-(4-phenoxyphenyl)-ethanone | Sandoray 1000 | Sandoz |
| 4,4'-Bis(chloromethyl)-benzophenone | Fl-4 | Eastman |
| Phenyl-tribromomethyl-sulphone | BMPS | Seitetsu Kakaku |
| Methyl -oxo-benzeneacetate | Vicure 55 | Stauffer |
| | Nuvopol P1 3000 | Rahn |
| Benzophenone | Benzophenone | |
| Blend of 2,4,6-trimethyl-benzophenone and benzophenone | Esacure TZT | Fratelli Lamberti |
| Blend of 4-methyl-benzophenone and benzophenone | Photocure 81 | Sunko |
| [4-(4-Methylphenylthio)phenyl] phenylmethanone | Quantacure BMS | International Bio-Synthetics |
| 3,3'-Dimethyl-4-methoxy benzophenone | Kayacure MBP | Nippon Kayaku |
| Methyl 2-benzoylbenzoate | Daitocure OB | Siber Hegner |
| 4-Phenyl-benzophenone | Trigonal 12 | Akzo |
| 4,4'-Bis(dimethylamino)-benzophenone | Michler's ketone | |
| Blend of 2-chloro and 4-chloro-thioxanthone | Kayacure CTX | Nippon Kayaku |
| Blend of 2-isopropyl- and 4-isopropylthioxanthone | Darocur ITX (2 isomer only) | Merck |
| | Quantacure ITX | International Bio-Synthetics |
| | Lucirin LR 8771 BASF | |
| | Speedcure ITX | Lambsons Ltd. |
| 2,4-Dimethylthioxanthone | Kayacure RTX | Nippon Kayaku |
| 2,4-Diethylthioxanthone | Kayacure DETX | Nippon Kayaku |
| Benzil | Benzil | |
| 1,7,7-Trimethyl-bicyclo[2.2.1] heptane-2,3-dione | Campherquinone | |
| Blend of benzil and 4-phenyl benzophenone | Trigonal P121 | Akzo |
| 4-Benzoyl-N,N,N-trimethyl-benzenemethanaminium chloride | Quantacure BTC | International Bio-Synthetics |
| 2-Hydroxy-3-(4-benzoylphenoxy)-N,N,N-trimethyl-1-propanaminium chloride monohydrate | Quantacure BPQ | International Bio-Synthetics |
| 2-Hydroxy-3-(3,4-dimethyl-9-oxo-9H-thioxanthon-2-yloxy)-N,N,N-trimethyl-1-propanminium chloride | Quantacure QTX | International Bio-Synthetics |
| 4-(13-Acryloyl-1,4,7,10,13-penta-oxatridecyl)benzophenone | Uvecryl P36 | UCB |
| 4-Benzoyl-N,N-dimethyl-N-[2-(1-oxo-2-propenyl)-oxyl[ethyl-benzenemethanaminium chloride | Quantacure ABQ | International Bio-Synthetics |
| | methyldiethanol-amine | |
| | triethanolamine | |
| Ethyl 4-(dimethylamino)benzoate | Quantacure EPD | International Bio-Synthetics |
| | Kayacure EPA | Nippon Kayaku |
| | Nuvopol EMBO | Rahn |
| | Speedcure EDB | Lambsons Ltd. |
| 2-n-Butoxyethyl 4-(dimethylamino)benzoate | Quantacure BEA | International Bio-Synthetics |
| | Speedcure BEDB | Lambsons Ltd. |
| Isoacryl 4-(dimethylamino) benzoate | Kayacure DMBI | Nippon Kayaku |
| 2-(dimethylamino)ethyl benzoate | Quantacure DMB | International Bio-Synthetics |
| 1-(4-Dimethylaminophenyl)-ethanone | PPA | Siber Hegner |
| Unsaturated copolymerisable tertiary amines | Uvecryl P 101 Uvecryl P 104 | UCB |

-continued

| | | |
|---|---|---|
| (structures not revealed) | Uvecryl P 105 Uvecryl P 115 | Radcure Specialties |
| Copolymerisable amine acrylates (structures not revealed) | Photomer 4116 | Harcros |
| | Photomer 4182 | Harcros |
| | Laromer LR 8812 | BASF |
| Bis($y^3$-cyclopentadienyl)bis[2,6-difluoro-3-(1H-pyrr-1-yl)phenyl]-titanium | Irgacure 784 | Ciba-Geigy |

| Structure | Comments | Tradename | Supplier |
|---|---|---|---|
| | mixture of sulphonium salts (1) | Cyracure UVI-6990 | Union Carbide |
| | mixture of sulphonium salts (2) | Cyracure UVI-6974 | Union Carbide |
| Bis[4-(diphenylsulphonio)-phenyl[sulphide bis-hexafluoro-phosphate | 30–40% solution in propylene carbonate | Degacure KI 85 | Degussa |
| Bis[4-(diphenylsulphonio)-phenyl]sulphide bis-hexafluoro-phosphate | 33% solution in propylene carbonate | SP-55 | Asahi Denka |
| Bis[4-(di-(4-(2-hydroxyethyl)phenyl)-sulphonio-phenyl] sulphide bis-hexafluorophosphate | 27% solution in propylene carbonate | SP-150 | Asahi Denka |
| Bis[4-(di-(4-(2-hydroxyethyl)phenyl)-sulphonio)phenyl] sulphide bis-hexafluoroantinomate | 60% solution in propylene | SP-170 | Asahi Denka |
| $^3$-2,4-(Cyclopenta-dienyl)[(1,2,3,4,5,6-)-(methylethyl)-benzene]-iron(II)hexa-fluorophosphate | | Irgacure 261 | Ciba-Geigy |

Other examples of suitable free-radical photoinitiators are described by K. Dietliker in *Chemistry and Technology of UV and EB Formulation for Coatings, Inks & Paints*, Vol. III, Selective Industrial Training Associates Ltd., London, U.K. (1991). Still others include the benzoin derivatives, benzoin ethers, acetophenone derivatives, azo-bis-isobutyronitrile, thioxanones and aromatic ketones of the formula:

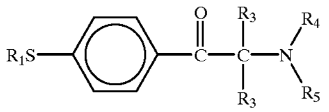

wherein $R_1$–$R_5$ =H, $C_1$–$C_{10}$ alkyl and $C_1$–$C_{10}$ aryl, an example being Igracure 907 by Ciba Geigy, described in "Radiation Curing of Polymers", *The Royal Society of Chemistry,* 1987, pp.184–195.

Examples of suitable cationic photoinitiators are aryldiazonium salts, diaryliodonium salts, triarylsulfonium salts and triarylselenonium salts. Representative formulas are given below.

Aryldiazonium salts of the formula $$\overset{+}{Ar}—N_2X—,$$

Diaryliodonium salts of the formulae

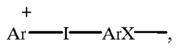

including

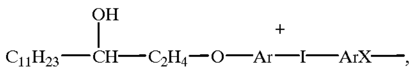

Triarylsulphonium salts of the formulae

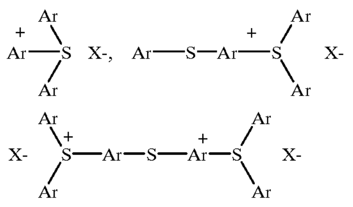

Triarylselenonium salts of the formula

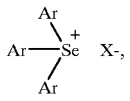

Dialkylphenacylsulphonium salts of the formula

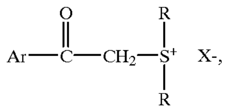

Aryloxydiarylsulphoxonium salts of the formula

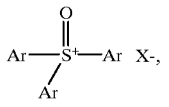

Dialylphenacylsulphoxonium salts of the formula

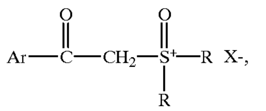

wherein Ar is phenyl or naphthyl, R is a $C_{1-10}$ hydrocarbon based moiety and X is a counter ion, typically $SbF_6$—, $AsF_6$—, $PF_6$— or $BF_6$—. Other suitable cationic photoinitiators include iron arene complexes (Igracure™ 261 by Ciba Geigy), nitrobenzyl triarylsilyl ethers, triarylsilyl peroxides and acylsilanes.

Typically, the photochemical decomposition products of cationic photoinitiators do not initiate the cationic polymerization directly. The decomposition products undergo further thermal reactions to produce the strong acid initiator, $H^+X$—. For example, the iodonium cation produced from photodegradation of diaryliodonium salts does not initiate polymerization but the strong acid generated therefrom does. Free radicals are also formed during this process, which indicates that iodonium salts can simultaneously cure via a free radical mechanism and a cationic mechanism.

The nature of the anion of the strong acid has a dramatic effect on the rate and extent of cationic polymerization. Nucleophilic anions compete with the monomers for the active cations during the polymerization. Very weakly (non) nucleophilic anions are required as counter ions in successful photoinitiators. The counter ions in common commercial use today are, in order reactivity toward cationic polymerization for the same photoreactive cation, $SbF_6^-$>$AsF_6^-$>$PF_6^-$>$BF_4^-$.

The photoinitiator used may be a single compound, a mixture of two or more active compounds or a combination of two or more different initiating compounds, i.e., a cationic photoinitiator with a free radical initiator which forms part of a multi-component initiating system or two cationic photoinitiator or two free-radical photoinitiators. For example, a combination of diaryl iodonium cation and tetrakis(pentafluorophenyl)borate anion. Combinations of photoinitiators can be used to provide a dual cure or a single compound can provide a dual cure as in the case of the diaryliodonium salts discussed above.

The photoinitiator is preferably incorporated in an amount of from 0.01 to 10 wt. %, based on the total weight of the coating formulation, most preferably about 2 wt. % of the total coating formulation. When the amount of photoinitiator is too small, cure is insufficient and where an excessive amount is used, rapid cure results in a decrease in molecular weight.

A photosensitizer may be optionally be used with the photoinitiator in amounts of from 0.01 to 10 wt. %, based on the total weight of the coating formulation. The sensitizers modify the absorption spectrum of a photoinitiating package. Sensitizers absorb light and are promoted to an excited state and are then able to transfer this energy to another molecule, usually the photoinitiator. This, in turn, promotes the photoinitiator to an excited state and the photochemical reaction occurs as if the photoinitiator had been directly excited by a photon. The structure of the photosensitizer remains unchanged. Photosensitizers are often added to shift the light absorption characteristics of a system. An example of a photosensitizer for cationic polymerizations is anthracene, which is used with the diphenyliodonium cation. Other suitable examples of photosensitizers for cationic cures include anthracene, perylene, phenothiazine, xanthone, thioxanthone and benzophenone.

Optionally, a photopolymerization initiation assistant may also be used. This is an agent which is not activated itself by ultraviolet radiation but which, when used with a photopolymerization initiator, helps the initiator speed up the initiation of polymerization; thus, realizing a more efficient cure.

The coating formulations of the present invention can comprise up to 95 wt. % photopolymerizable monomer and/or oligomer, the balance being sensible material. The coating formulations of the present invention have at least 5 wt. % photopolymerizable monomer and/or oligomer so as to function as a carrier for the coating formulation components, even when diluted by a plasticizer. Preferred levels will depend on the monomers used, their reactivity and the solubility of the other components therein. Amounts of photopolymerizing monomer and/or oligomer ranging from 30 wt. %–60 wt. % are generally suitable.

Photopolymerizable monomers and oligomers which are suitable for use in this invention are 1) liquid at 50 C and are preferably liquid at ambient temperature and 2) polymerize by either a cationic mechanism or free-radical mechanism or both to form a thermoplastic polymer, i.e., one which softens and flows when exposed to a temperature at or below 300 C.

Cationically polymerizable monomers and oligomers are preferred for use in these coating formulations and include those selected from the group consisting of epoxies, vinyl ethers, cyclic ethers, cyclic thioethers and vinyl functional hydrocarbons. The epoxy monomers and oligomers have at least one oxirane moiety of the formula

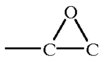

The epoxies are particularly preferred monomers and oligomers used in the present invention.

Other cyclic ethers suitable for use in the present invention include butylene oxides with structural units of the formula:

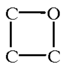

pentylene oxides with structural units of the formula:

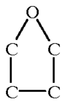

thiopropylenes with structural units of the formula:

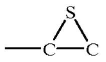

1,3,5-trioxanes with structural units of the formula:

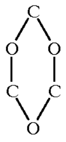

hexyl lactones with structural units of the formula:

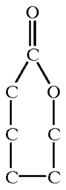

and 1,4,6,9-tetraoxaesperononanes with structural units of the formula:

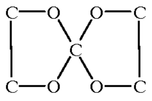

Other particularly preferred cationically photopolymerizable monomers and oligomers are the vinyl ether monomers and oligomers. Conventional vinyl ether monomers and oligomers which have at least one vinyl ether group —O—CR'═CRH, wherein R and R' are each, independently, H or $C_{1-8}$-alkyl, are suitable. Suitable vinyl ether monomers and oligomers vary widely in structure and performance. Those with vinyl ether groups where both R and R'=H are preferred. Epoxy monomers and oligomers and vinyl ether monomers and oligomers with two or more reactive groups can be used to increase crosslinking. Mixtures of epoxy and vinyl ether monomers and oligomers may also be used.

Specific examples of suitable epoxy monomers and oligomers include the "1,2-cyclic ethers" disclosed in U.S. Pat. No. 5,437,964 and those described in *Ring-Opening Polymerizations*, Vol. 2, by Frisch and Reegan, Marcel Dekker, Inc. (1969). Suitable epoxies are aliphatic, cycloaliphatic, aromatic or heterocyclic and will typically have an epoxy equivalency of from 1 to 6, preferably 1 to 3. Suitable examples include propylene oxide, styrene oxide, vinylcyclohexene oxide, vinylcyclohexene dioxide, glycidol, butadiene oxide, diglycidyl ether of bisphenol A, oxetane, octylene oxide, phenyl glycidyl ether, 1,2-butane oxide, cyclohexeneoxide, 3,4-epoxycyclohexylmethyl-3,4-epoxycyclohexanecarboxylate, 3,4-epoxy-6-methylcyclohexylmethyl-3,4-epoxy-6-methylcyclohexanecarboxylate, bis(3,4-epoxy-6-methylcyclohexylmethyl)adipate, dicyclopentadiene dioxide, epoxidized polybutadiene, 1,4-butanediol diglycidyl ether, polyglycidyl ether of phenolformaldehyde resole or novolak resin, resorcinol diglycidyl ether, epoxy silicones, e.g., dimethylsiloxanes having cycloaliphatic epoxide or glycidyl ether groups, aliphatic epoxy modified with propylene glycol and dipentene dioxide.

A wide variety of commercial epoxy resins are available and listed in *Handbook of Epoxy Resins* by Lee and Neville, McGraw Hill Book Company, New York (1967) and in *Epoxy Resin Technology* by P. f. Bruins, John Wiley & Sons, New York (1968).

Preferred epoxies include:

(1) monofunctional epoxy monomers/oligomers such as epoxy grafted polyesters (Vikopol 24, Vikopol 26 by Elf Atochem), cycloaliphatic monoepoxies, such as those of the formulae

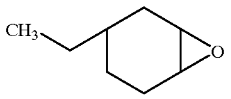

and

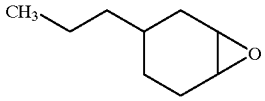

and mixtures of cycloaliphatic monoepoxies available from Union Carbide under the trade name UVR 6100 having an epoxy equivalent weight of 130 to 140, limonene monoxide, epoxidized alpha olefins of the formula

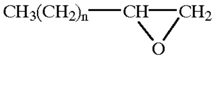

when n=1–30$^{+}$, silicone epoxy oligomers, alpha pinene oxide, and the like;

(2) bifunctional monomers such as limonene dioxide, bisphenol-A epoxy, cycloaliphatic diepoxides such as bis(3,4-epoxycyclohexyl)adipate of formula (a)

(a)

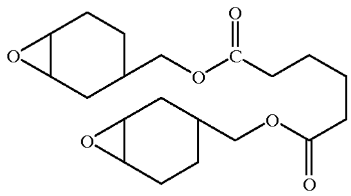

and 3,4-epoxycyclohexylmethyl-3,4-epoxycyclohexane carboxylate (commercially available from Union Carbide under the trade name Cyracure® and from Sartomer under the trade name Sarcat® of formula (b)

(b)

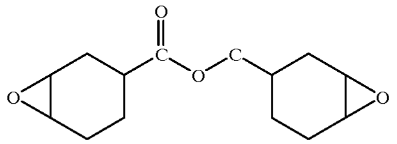

and the like; and (3) polyfunctional monomers such as those of general formula (c), including epoxidized polybutene, epoxidized soybean oil, linseed fatty acid esters and the like.

(c)

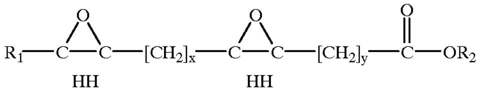

Vinyl Ether Monomers

Examples of suitable monomers and oligomers having at least one or more vinyl ether groups include those disclosed in U.S. Pat. No. 4,950,696 and those of the following general formula:

$$(RCH{=}CR'{-}O{-}Z')_n{-}B$$

where

R and R' are each, independently H or $C_{1-8}$ alkyl,

Z' is a direct bond or a divalent moiety having $C_{1-20}$ carbon atoms selected from the group consisting of alkylene, cycloalkylene, or polyalkylene ether moieties, n is an integer from 1 to 4, B is hydrogen or a moiety derived from aromatic and aliphatic hydrocarbons, alcohols, cycloaliphatic hydrocarbons, esters, ethers, siloxanes, urethanes, and carbonates, of from 1 to 40 carbon atoms.

Monofunctional monomers are those which have n=1, while the multifunctional monomers are those which have n=2 to 4.

Suitable vinyl ether monomers can also be defined by the following specific formulae:

a) Vinyl ether terminated aliphatic monomers of the formula $$M_2{-}({-}({-}OZ{-})_m{-}OCR'{=}CHR)_n$$

where n is 1 to 4, m is 0 to 5, and $M_2$ is a mono, di, tri, or tetra functional aliphatic or cycloaliphatic moiety having from 4–40 carbon atoms;

Z is a divalent moiety having $C_{1-20}$ carbon atoms selected from the group consisting of alkylene, cycloalkylene or polyalkylene moieties, and R and R' are each, independently, H or $C_{1-8}$ alkyl.

Preferred are mono and difunctional vinyl ethers based on normal alkanes having the general formula:

$$CHR{=}CR'{-}O(CH_2)_y{-}R'',$$

wherein y=1 to 18

R=—H, or $C_{1-8}$ alkyl

R'=—H, or $C_{1-8}$ alkyl

R"=—H, —OH, or —O—CR'=CHR;

mono and difunctional vinyl ethers based on ethylene glycol having the general formula:

$$CHR{=}CR'{-}(OCH_2CH_2)_y{-}R'',$$

wherein y=1 to 6 and

R, R' and R" are as defined above; and mono and difunctional vinyl ethers based on 1,3-propanediol and 1,4-butanediol having the general formula:

$$CHR{=}CR'{-}(O(CH_2)_x)_y{-}R'',$$

wherein x=3 or 4 y=1 to 6 and

R, R' and R" are as defined above.

b) Vinyl ether terminated ester monomers of the formula

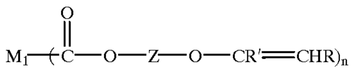

where n is 1 to 4, $M_1$ is a mono, di, tri, or tetra functional moiety having from 1–15 carbon atoms selected from the group consisting of alkylene, arylene, aralkylene and cycloalkylene moieties, Z is a divalent moiety having $C_{1-20}$ carbon atoms selected from the group consisting of alkylene, cycloalkylene, or polyalkylene ether moieties, R and R' are each, independently, a monovalent moiety selected from the group consisting of H and alkyl groups having 1–8 carbon atoms.

c) Vinyl ether terminated ether monomers derived from ether compounds such as HO—$[CH_2CH_2O]_m$H, wherein m is 2–5.

d) Vinyl ether terminated aromatic monomers of the formula $$M_3{-}({-}OZ{-}OCR'{=}CHR)_n$$

where n is 1 to 4, and $M_3$ is a mono, di, tri, or tetrafunctional aromatic moiety having 6 to 40 carbon atoms; and Z, R' and R" are as defined above.

e) Vinyl ether terminated siloxane monomers of the formula $(RCH{=}CR'O{-}Z')_n{-}A$, wherein A is a polysiloxane with from 4 to 15 silicon atoms;

n=1–4 and

R, R' and Z' are as defined above.

f) Vinyl ether terminated carbonate monomers of the formula

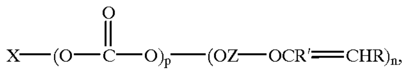

wherein x is a diester, diol or polyol moiety of from 2 to 20 carbon atoms, n is 1–4, p is 0 to 3,and R, R' and Z are as defined above.

Specific vinyl ethers which are suitable include a) bisphenol A derivatives and other aromatic vinyl ethers of the formulae (1) and (2):

(1)

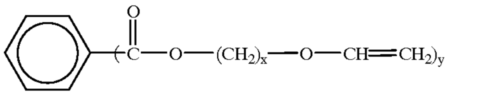

where x is 2 or 4, y is 2 or 3;

(2)

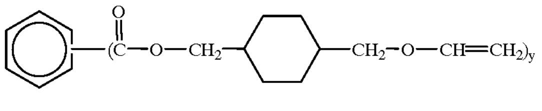

where y is 2 b) ester derived divinyl ethers of the formulae (3) and (4):

wherein R''' is H, OH or O—CH=$CH_2$, d) poly ether derived vinyl ethers of the formulae (6) and (7):

(6)

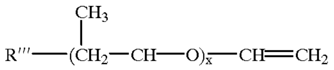

where x is 2, 3, or 4 and R''' is H, OH or —O—CH=$CH_2$, $CH_3CH_2$—C($CH_2$—O—$CH_2CH_2O$—CH=$CH_2$)$_3$ (7)

and e) phenol derived vinyl ethers of the formulae (8) and (9)

(8)

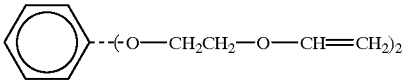

(9)

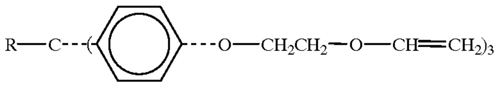

where R is H or $CH_3$.

Common vinyl ether monomers which are suitable include ethyl vinyl ether, propyl vinyl ether, isobutyl vinyl ether, octadecyl vinyl ether, hydroxybutyl vinyl ether, propenyl ether of propylene carbonate, dodecyl vinyl ether, cyclohexyl vinyl ether, 2-ethylhexyl vinyl ether, butyl vinyl ether, ethyleneglycol monovinyl ether, diethyleneglycol divinyl ether, butanediol monovinyl ether, butane diol divinyl ether, hexane diol divinyl ether, ethylene glycol butyl vinyl ether, triethylene glycol methyl vinyl ether, cyclohexane dimethanol monovinyl ether, cyclohexane dimethanol divinyl ether, 2-ethylhexyl vinyl ether, poly-THF divinyl ether, CRH=CR—[O$(CH_2)_4$—O]$_n$—CR=CRH, pluriol-E-200-vinyl ether, CRH=CR—[O—$CH_2$—$CH_2$]$_n$—O—CR=CRH and the like.

(3)

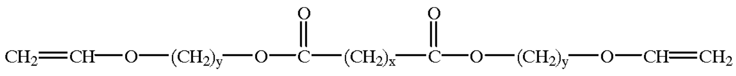

where x is 2, 3, or 4, y is 2 or 4; and (4)

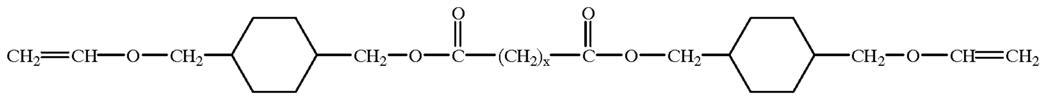

where x is 2, 3, or 4 c) cycloaliphatic diol derived vinyl ethers of formula (5):

(5)

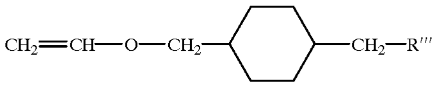

As indicated above, photopolymerizable monomers and oligomers which polymerize by a free radical cure can also be used in the coating formulations of the present invention. The monomers and oligomers which polymerize by free radical polymerization are typically sensitive to light such that exposure to ambient light must be avoided when preparing the thermal transfer ribbons herein. Examples of suitable free-radical photopolymerizing monomers and oligomers include acrylate monomers, methacrylate monomers, acrylic acids, methacrylic acids, epoxy acrylates and epoxy methacrylates. This is commonly referred to as a dual cure mechanism. Other dual cure systems, i.e., UV and thermal, are also suitable where the thermal cure is provided by separate components.

The acrylates, methacrylates, acrylic acids and methacrylic acids have at least one functional group that conforms to the general formula B below:

B

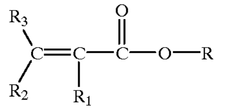

wherein R, $R_1$, $R_2$ and $R_3$=H or a hydrocarbon based radical. The acrylates and methacrylates ($R_1$=a hydrocarbon based radical) are preferred over the acrylic acids and methacrylic acids (R=H). Preferred acrylates are methyl methacrylate and ethyl methacrylate monomers. Hydrocarbon based radicals of R and $R^1$ include methyl, ethyl, propyl, isopropyl, n-butyl, sec-butyl, isobutyl, tert-butyl, hexyl, heptyl, 2-heptyl, 2-ethylhexyl, 2-ethylbutyl, dodecyl, hexadecyl, 2-ethoxyethyl, isobornyl and cyclohexyl. The preferred acrylates are those wherein R and $R^1$ are selected from the $C_1$–$C_6$ series and $R^2$ is H. Monomers with two or more functional groups of formula B can also be used as well as the following oligomers: acrylated amines, polyester acrylates, urethane acrylates, polyether acrylates and acrylated polybutadiene. Other monomers having unsaturated carbon-carbon double bonds can be used in a minor portion with the acrylic acids, acrylates, methacrylates and methacrylic acids. These include styrene, vinyl acetate, vinyl chloride, vinylidene chloride, butadiene, isoprene, propylene, vinyl alcohol and the like.

The coating formulations of this invention optionally and most preferably contain another binder component. This can comprise one or more waxes and/or one or more thermoplastic resins. Suitable waxes are natural waxes such as carnauba wax, candelilla wax, bees wax, rice bran wax; petroleum waxes such as paraffin wax; synthetic hydrocarbon waxes such as low molecular weight polyethylene and Fisher-Tropsch wax; higher fatty acids such as myristic acid, palmitic acid, stearic acid and behenic acid; higher aliphatic alcohols such as stearyl alcohol and esters such as sucrose fatty acid esters. Mixtures of waxes can also be used. Examples of preferred waxes are carnauba wax under the Slip-Ayd series of surface conditioners by Daniel Products Co. and low molecular weight polyethylene.

The melting point of the wax typically falls within the range of from 50 C to 250 C, preferably from 50 C to 140 C. Waxes with melting points at the high end are advantageous in that they aid in the integrity of the printed image. The amount of wax used in the coating formulations of present invention is preferably at or above 5 wt. % based on the dry ingredients, most preferably 10 to 60 wt. %. To aid in processing, rheology and compatibility with binder resin, micronized grades of wax are preferred.

The coating formulations of this invention may optionally contain one or more thermoplastic resins which are non-reactive, i.e. the thermoplastic resin does not participate in the photopolymerization reaction, or thermoplastic resins with reactive functional groups with sites for reaction with the photopolymerizable monomers and/or oligomers. Suitable non-reactive thermoplastic resins include those used in conventional coating formulations such as those described in U.S. Pat. Nos. 5,240,781 and 5,348,348 and the following: polyvinylchloride, polyvinyl acetate, vinyl chloride-vinyl acetate copolymers, polyethylene, polypropylene, polyacetal, ethylene-vinyl acetate copolymers, ethylene alkyl (meth)acrylate copolymers, ethylene-ethyl acetate copolymer, polystyrene, styrene copolymers, polyamide, ethylcellulose, epoxy resin, polyketone resin, terpene resin, petroleum resin, polyurethane resin, polyvinyl butyryl, styrene-butadiene rubber, nitrile rubber, acrylic rubber, ethylene-propylene rubber, ethylene alkyl (meth)acrylate copolymer, styrene-alkyl (meth)acrylate copolymer, acrylic acid-ethylene-vinyl acetate terpolymer, saturated polyesters and sucrose benzoate. Suitable saturated polyesters are further described in U.S. Pat. No. 4,983,446.

Reactive thermoplastic resins include free-radical photopolymerizable polymers such as aromatic urethane acrylates, aliphatic urethane acrylates, polyester acrylates, acrylated amines, acrylated polybutadiene and polyether acrylates.

The coating formulations may contain two or more thermoplastic resins to provide specific property profiles. For example, Piccotex resins by Hercules are hydrocarbon resins (vinyl toluene-alpha methyl styrene copolymers) that provide high hot tack properties which aid adhesion of the coating to the synthetic resin receiving substrate upon transfer. Polyethylene SL 300, a polyethylene resin emulsion of a small (submicron) particle size is a surface conditioner within the Slip-Ayd series by Daniel Products which provides slip or wax-like properties for transfer.

In addition to special properties such as these, the thermoplastic resin provides a higher melting point than the wax so that the image resulting therefrom exhibits high smear and scratch resistance when used in place of wax. The thermoplastic resin has a melting/softening point of less than 300 C and preferably in the range of 50 C to 250 C. The thermoplastic resin may comprise from 0 wt. % to 50 wt. % of the total dry ingredients. To provide high scratch and smear resistant images on synthetic resin substrates, the thermoplastic resin may comprise more than 25 wt. %, based on total dry ingredients, of the coating formulation.

The response of the thermal transfer layer formed to a thermal transfer printer can be adjusted by controlling the glass transition temperature and the degree of crosslinking of the polymer formed and by adjusting the proportion and identity of other binder components in the formulation. Mixtures of monomers and oligomers can be used to modify the properties (Tg and crosslinking) of the resultant polymer. The structure of the polymer obtained can vary from a linear thermoplastic to polymers with increased crosslinking up to a highly crosslinked thermoset. Monofunctional monomers typically polymerize to form thermoplastic polymers, while multifunctional monomers or oligomers will form thermosets due to the larger number of reactive sites per polymerizing unit. Where a mixture of monofunctional monomers are used, random copolymers are formed. The glass transition temperature (Tg) of a linear copolymer can typically be varied by adjusting the ratio of monomers within a chain length. The glass transition temperature ($Tg_R$) of a random copolymer can be predicted by equation 1

$$\left|\frac{1}{Tg}\right|_R = W_1\left|\frac{1}{Tg}\right|_1 + W_2\left|\frac{1}{Tg}\right|_2$$

wherein $W_1$ and $W_2$ are weight fractions of components 1 and 2, and $(1/Tg)_1$ and (1/Tg)2 are the reciprocal values for glass transition temperatures of the respective homopolymers of each monomer. Typically, bulky, high molecular weight monomers generate polymers with higher glass transition temperatures.

If desirable, monofunctional, difunctional or multifunctional alcohols can be added to the coating formulation for incorporation into the backbone of the polymers formed to help control crosslinking and Tg. Multifunctional alcohols can provide crosslinking sites. Difunctional alcohols provide chain extension and monofunctional alcohols provide chain transfer and can serve to terminate polymer chains and control molecular weight. Short polymer chain lengths provided by the use of high levels of monofunctional alcohol during polymerization will reduce Tg values. Each growing polymer chain can be terminated by an alcohol. This forms an ether linkage and liberates a proton. This proton is free to initiate a new cationic chain reaction. The addition of alcohols into an epoxy cationic polymerization process increases the speed of reaction. This is attributed to the greater mobility of the proton as compared to the cations of the growing polymer chains. It is common practice to add a small amount of alcohol to a formulation to speed up the cationic reaction.

A number of alcohols are manufactured specifically for incorporation into cationically cured epoxies. Typical examples include the tone polyols, diethylene glycol, triethylene glycol, dipropylene glycol and polyether polyols. Mono- and difunctional alcohols having molecular weights in the range of 3,000 to 4,000 function very well in UV cationically cured systems. Such alcohols can form block copolymers with epoxy monomers. The difunctional alcohols form ABA block copolymers. With these large molecular weight alcohols, the cationic polymerizations of the epoxy monomers build on alcohol groups instead of on the epoxy groups.

Conventional fillers, emulsifiers, dispersants, surfactants, defoaming agents, flow adjusters or leveling agents may also be incorporated to improve the properties of the thermal transfer medium provided they are not basic where a cationic photopolymerization initiator is added. Any basic material will quench the cations and prevent polymerization. Illustrative examples of flow adjusters are low molecular weight organopolysiloxanes such as methylpolysiloxanes which may be used in an amount of 0.01–10 wt. % based on weight of the total ink formulation. An illustrative example of a defoamer, i.e., a surfactant, is Anti-Musal JIC, which may be used in an amount of 0.01–10 wt. % based on the weight of the total ink formulation. Illustrative examples of leveling agents are low molecular weight polysiloxane/polyether copolymers and modified organic polysiloxanes, which may be used in an amount of 0.01–10 wt. % based on the weight of the total ink formulation.

Other suitable additives for the coating formulations are photostabilizers which prevent polymerization of inks by natural or ambient light where the photoinitiator is activated by UV radiation.

Plasticizers such as those described in U.S. Pat. No. 3,663,278, may also be used to aid flexibility of the image formed and/or reduce the viscosity of the coating formulation. Suitable plasticizers include adipic acid esters, phthalic acid esters and ricinoleate acid esters, citrates, epoxides, glycerols, glycols, hydrocarbons and chlorinated hydrocarbons, phosphates and the like. Other suitable additives include flexibilizers (oil) and fillers.

The above components can be mixed and dispersed uniformly by an appropriate means such as a simple impeller within a tank or similar vessel or a roll mill to obtain the coating formulation of the present invention and where necessary, they may be ground in an attritor.

The coating formulation of the present invention adheres well to various supporting substrates such as coated and uncoated paper and plastic ribbon in addition to other plastic, wood, glass, ceramic and metal materials and shows little or no removal or peeling off from these surfaces caused by stress or strain and exhibits an excellent flowability to the deformation of the substrate.

The thermal transfer medium of the present invention comprises a substrate, preferably a thin smooth paper or plastic-like material and a thermal transfer layer comprised of cured coating formulation of the present invention. Suitable components for the coating formulation are as described above, i.e. sensible material, photoinitiator and photopolymerizable monomers and oligomers and optional wax/thermoplastic resin, alcohols and additives.

Suitable substrate materials include tissue type paper materials such as 30–40 gauge capacitor tissue, manufactured by Glatz and polyester-type plastic materials such as 14–35 gauge polyester film manufactured by Dupont under the trademark Mylar®. Polyethylene naphthalate films, polyethylene terephthalate films, polyamide films such as nylon, polyolefin films such as polypropylene film, cellulose films such as triacetate film and polycarbonate films are also suitable. The substrates should have high tensile strength to provide ease in handling and coating and preferably provide these properties at minimum thickness and low heat resistance to prolong the life of heating elements within thermal print heads. The thickness is preferably 3 to 10 microns. If desired, the substrate or base film may be provided with a backcoating on the surface opposite the thermal transfer layer.

The thermal transfer media of the present invention can be prepared by the method of this invention which comprises coating a supporting substrate with a layer of the coating formulation, preferably using conventional coating equipment and preferably in darkness, and exposing the coated substrate to UV or visible light to initiate reaction of the photopolmerizable monomers and/or oligomers within the layer of coating formulation.

Suitable light sources for curing the layer of coating formulation on the supporting substrate depend on the photoinitiator used. Those responsive to visible light can be cured by ambient light from conventional incandescent light bulbs, fluorescent light bulbs or sun light. Those photoinitiators responsive to the UV light can be activated by high and medium pressure mercury lamps, xenon-lamps, arc lamps and gallium lamps and the like.

The thermal transfer printers provided by this invention comprise a thermal transfer print head with heating elements which transfer ink from a thermal transfer ribbon to a receiving substrate, a ribbon feeder which feeds a thermal transfer ribbon to the heating elements of the thermal transfer print head and at least one thermal transfer ribbon positioned within the ribbon feeder, the improvement comprising employing a thermal transfer ribbon of the present invention.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by weight. All publications and patents cited above and below are hereby incorporated by reference.

EXAMPLES

Example 1

Coating Formulation

An coating formulation of the present invention is prepared by combining the following components. The photoinitiator is added last, preferably in darkness.

| Component | Function | Amoiunt (wt. %) | |
|---|---|---|---|
| Spectracure blue 15:3[1] | Pigment | 3 | 10 |
| Limonene Dioxide[2] | Epoxy monomer | 20 | 40 |
| UVR 6216[3] | Epoxy monomer | 15 | 35 |
| s-nauba[4] | Wax | 25 | 40 |
| Picotex 75[5] | Non-reactive resin | 0 | 20 |
| CD-1012[6] | Photonitiator | 1 | 8 |

[1]Spectracure Blue 15:3
Sun Chemical Corporation
Pigments Division
411 Sun Avenue
Cincinnatti, OH 45232
[2]Limonene Dioxide
Elf Atochem North America
Specialty Epoxides
2000 Market Street
Philadelphia, PA 19103
[3]Cyracure UVR-6216,
1,2-epoxyhexadecane
Union Carbide Chemical and Plastics Company, Inc.
Solvents and coatings Materials Division
39 Old Ridgebury Road
Danbury, CT 06817-0001
[4]S-nauba
Shamrock Technologies, Inc.
Foot of Pacific St.
Newark, NJ 07114
[5]Piccotex 75
Hercules Incorporated
Hercules Plaza
Wilmington, Delaware 19894
[6]CD-1012, Diaryliodonium
Hexafluoroantimonate
Sartomer Company, Inc.
Oaklands Corporate Center
502 Thomas Jones Way
Exton, Pennsylvania 19341

The resulting coating formulation has a solids content of 100%.

Example 2

Thermal Transfer Medium

A film of the coating formulation of Example 1 is applied to a glass plate with a wood applicator and is exposed to ultraviolet light from a non-doped Mercury Arc lamp at an intensity of 300 watts/in for 3 seconds, while traveling 15–20 ft./min. in a U.V. cabinet from U.V. Process Supply Inc., 4001 North Ravenswood Avenue, Chicago, Ill. 60613. The film is not tacky and shows good adhesion to the substrate.

The coating formulation can be applied to a polyester film at a coat weight conventional for functional layers to form a thermal transfer ribbon. This ribbon can be fed through a conventional thermal transfer printer operating at a conventional print head energy (2) and speed (2"/sec.) to produce bar codes of suitable resolution and integrity.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A coating formulation for preparing a thermal transfer layer of a thermal transfer ribbon which transfers to a receiving substrate upon the application of heat from a thermal print head of a thermal transfer printer,
said coating formulation comprising:
a) at least one photopolymerizable monomer, oligomer or mixture thereof in an amount of at least 5 wt. % of said coating formulation, wherein said photopolymerizable monomer, oligomer or mixture thereof is liquid at 50° C. and photopolymerizes to form a thermoplastic polymer having a softening point less than 300° C. and $T_g$ value less than 275° C.;
b) at least one cationic or free radical polymerizing photoinitiator which will initiate polymerization of the photopolymerizable monomer, oligomer or mixture thereof when exposed to UV radiation or visible light;
c) at least one sensible material, wherein the sensible material is either solubilized, dispersed or emulsified within the photopolymerizable monomer, oligomer or mixture thereof;
d) at least one wax in an amount within the range of 5 wt. % to 80 wt. %.

2. A coating formulation for preparing a thermal transfer layer of a thermal transfer ribbon which transfers to a receiving substrate upon the application of heat from a thermal print head of a thermal transfer printer,
said coating formulation comprising:
a) at least one photopolymerizable monomer, oligomer or mixture thereof in an amount of at least 25 wt. % of said coating formulation wherein said photopolymerizable monomer, oligomer or mixture thereof is liquid at ambient temperature and photopolymerizes to form a thermoplastic polymer having a softening point less than 300° C. with a $T_g$ value less than 275° C.;
b) at least one wax;
c) at least one cationic or free-radical photoinitiator which will initiate polymerization of the photopolymerizable monomer, oligomer or mixtures thereof when exposed to UV or visible light; and
d) at least one sensible material, wherein said coating formulation is free of organic and aqueous solvents.

3. A coating formulation as in claim 2 which contains a thermoplastic resin in an amount within the range of 5 wt. % to 50 wt. %.

4. A coating formulation for preparing a thermal transfer layer of a thermal transfer ribbon which transfers to a receiving substrate upon the application of heat from a thermal print head of a thermal transfer printer,
said coating formulation comprising:
a) at least one photopolymerizable monomer, oligomer or mixture thereof in an amount of at least 5 wt. % of said coating formulation, wherein said photopolymerizable monomer, oligomer or mixture thereof is liquid at 50° C. and photopolymerizes to form a thermoplastic polymer having a softening point less than 300° C. and $T_g$ value less than 275° C.;
at least one cationic or free radical polymerizing photoinitiator which will initiate polymerization of the photopolymerizable monomer, oligomer or mixture thereof when exposed to UV radiation or visible light; and
c) at least one sensible material, wherein the sensible material is either solubilized, dispersed or emulsified within the photopolymerizable monomer, oligomer or mixture thereof, wherein the photoinitiator provides both cationic and free radical polymerization.

5. A coating formulation as in claim 4 for preparing a thermal transfer layer of a thermal transfer ribbon which transfers to a receiving substrate upon the application of heat from a thermal print head of a thermal transfer printer, said coating formulation comprising:

at least one photopolymerizable monomer, oligomer or mixture thereof in an amount of at least 5 wt. % of said coating formulation, wherein said photopolymerizable monomer, oligomer or mixture thereof is liquid at 50° C. and photopolymerizes to form a thermoplastic polymer having a softening point less than 300° C. and $T_g$ value less than 275° C.;

at least one cationic or free radical polymerizing photoinitiator which will initiate polymerization of the photopolymerizable monomer, oligomer or mixture thereof when exposed to UV radiation or visible light; and at least one sensible material, wherein the sensible material is either solubilized, dispersed or emulsified within the photopolymerizable monomer, oligomer or mixture thereof, which comprises two or more photoinitiators.

6. A coating formulation as in claim 5, wherein a single photoinitiator provides both cationic and free radical polymerization.

7. A coating formulation as in claim 2 which additionally contains thermal polymerization initiators and at least one monomer, oligomer or mixture thereof for thermal polymerization.

8. A coating formulation as in claim 2 which comprises at least two photopolymerizable monomers or oligomers.

9. A coating formulation as in claim 8, wherein one of the monomers or oligomers contains at least two reactive groups which participate in photopolymerization.

10. A coating formulation as in claim 2, wherein the photopolymerizable monomer and oligomer are selected from the group consisting of epoxides, vinyl ethers, acrylates and methacrylates.

11. A coating formulation as in claim 10 which additionally comprises an alcohol.

12. A coating formulation as in claim 11, wherein the alcohol is a monofunctional alcohol that is liquid at 50 C.

13. A coating formulation as in claim 2 which contains no organic solvent or aqueous solvent.

14. A coating formulation as in claim 2, wherein the monomers and oligomers are selected from the group consisting of:

a) monofunctional monomers selected from the group consisting of cycloaliphatic monoepoxies, epoxidized alpha olefins, limonene monoxide and epoxidized polybutadiene;

(b) bifunctional monomers and oligomers selected from the group consisting of bis(3,4-epoxycyclohexyl) adipate, limonene dioxide, bisphenol-A epoxy and 3,4-epoxycyclohexylmethyl-3,4-epoxycyclohexane carboxylate; and (c) polyfunctional monomers and oligomers selected from the group consisting of epoxidized soybean oil and linseed fatty acid esters.

15. A coating formulation for preparing a thermal transfer layer of a thermal transfer ribbon which transfers to a receiving substrate upon the application of heat from a thermal print head of a thermal transfer printer, said coating formulation comprising:

at least one photopolymerizable monomer, oligomer or mixture thereof in an amount of at least 5 wt. % of said coating formulation, wherein said photopolymerizable monomer, oligomer or mixture thereof is liquid at 50° C. and photopolymerizes to form a thermoplastic polymer having a softening point less than 300° C. and $T_g$ value less than 275° C.;

at least one cationic or free radical polymerizing photoinitiator which will initiate polymerization of the photopolymerizable monomer, oligomer or mixture thereof when exposed to UV radiation or visible light; and at least one sensible material wherein the sensible material is either solubilized, dispersed or emulsified within the photopolymerizable monomer, oligomer or mixture thereof, wherein the photoinitiator is a cationic photoinitiator selected from the group consisting of aryldiazonium salts, diaryliodonium salts, triarylsulphonium salts, triarylselenonium salts, dialkylphenacylsulphonium salts, aryloxydiarylsulphoxonium salts and dialylphenacylsulphoxonium salts.

16. A coating formulation as in claim 2 which additionally contains a photosensitizer.

17. A coating formulation as in claim 15 which contains from 5 to 50 wt. % thermoplastic resin based on total solids.

18. A coating formulation as in claim 2, wherein the photoinitiator has an absorption within the UV range.

19. A coating formulation as in claim 2, wherein the photoinitiator has an absorption within the visible light range.

20. A coating formulation as in claim 2, wherein the sensible material is carbon black.

21. A coating formulation as in claim 2 wherein, the up to 80% of the photopolymerizable monomers and oligomers have more than one oxirane group of the formula

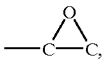

more than one vinyl ether group of the formula —O—CR'═CRH, wherein R and R' are each H of $C_{1-8}$ alkyl or more than one group of the formula

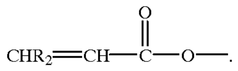

22. A coating formulation as in claim 2, wherein the sensible material is carbon black.

23. A thermal transfer medium comprising a substrate and a thermal transfer layer which comprises a sensible material and a binder for said sensible material, said binder comprising a thermoplastic resin having a softening point less than 300 C and $T_g$ value less than 275 C formed from UV or light cured photopolymerizable monomers, oligomers or a mixture thereof and residual photoinitiators.

24. A thermal transfer medium as in claim 23, wherein the thermoplastic resin binder is derived from at least two UV or light cured photopolymerizable monomers.

25. A thermal transfer medium as in claim 23, wherein the UV or light cured photopolymerizable monomers, oligomers or mixture thereof is selected from the group consisting of epoxies, cyclic ethers, vinyl ethers, acrylates, acrylic acids, methacrylates and methacrylic acids.

26. A thermal transfer medium as in claim 23, wherein the thermoplastic resin formed from UV or light cured photopolymerizable monomers, oligomers or mixtures thereof comprises 100% of the binder.

27. A thermal transfer medium as in claim 23, wherein the thermoplastic resin formed from UV or light cured photopolymerizable monomers, oligomers or mixtures thereof comprises 5–80 wt. % of the binder.

28. A thermal transfer medium as in claim 23 which comprises an additional binder material selected from the group consisting of waxes and non-reactive thermoplastic resins.

29. A thermal transfer medium as in claim 23, wherein the thermoplastic resin binder derived from UV or visible light cured photopolymerizable monomers, oligomers or a mixture thereof is chain terminated by a monofunctional alcohol.

30. A thermal transfer medium as in claim 23, wherein the thermoplastic resin derived from UV or visible light cured photopolymerizable monomer, oligomer or mixture thereof contains crosslinks provided by a multi-functional alcohol, or a multi-functional epoxy, vinyl ether, acrylate, methacrylate, acrylic acid or methacrylic acid.

31. A thermal transfer medium as in claim 23 which additionally contains reactive components which will polymerize when exposed to temperatures in the range of 125 C to 200 C.

32. A thermal transfer medium as in claim 23, wherein said UV or visible light cured photopolymerizable monomer, oligomer or a mixture thereof, is selected from the group consisting of epoxies and vinyl ethers.

33. A thermal transfer medium as in claim 23 which comprises from 10–50 wt. % wax.

34. A thermal transfer medium as in claim 23, wherein the monomers and oligomers are selected from the group consisting of:

a) monofunctional monomers selected from the group consisting of cycloaliphatic monoepoxies, epoxidized alpha olefins, limonene monoxide and epoxidized polybutadiene;

(b) bifunctional monomers and oligomers selected from the group consisting of bis(3,4-epoxycyclohexyl) adipate, limonene dioxide, bisphenol-A epoxy and 3,4-epoxycyclohexylmethyl-3,4-epoxycyclohexane carboxylate; and (c) polyfunctional monomers and oligomers selected from the group consisting of epoxidized soybean oil and linseed fatty acid esters.

35. A thermal transfer medium as in claim 23, wherein the residual photoinitiator is a cationic photoinitiator selected from the group consisting of:

aryldiazonium salts, diaryliodonium salts, triarylsulphonium salts, triarylselenonium salts, dialkylphenacylsulphonium salts, aryloxydiarylsulphoxonium salts and dialylphenacylsulphoxonium salts.

36. A thermal transfer medium as in claim 23 which additionally comprises a photosensitizer.

37. A thermal transfer medium as in claim 23, which comprises two or more thermal transfer layers.

38. A thermal transfer printer which comprises a thermal transfer print head with heating elements which transfer ink from a thermal transfer ribbon to a receiving substrate, a ribbon feeder which feeds a thermal transfer ribbon to the heating elements of the thermal transfer print head and at least one thermal transfer ribbon positioned within the ribbon feeder, the improvement comprising employing a thermal transfer ribbon of claim 26.

* * * * *

UNITED STATES PATENT AND TRADEMARK OFFICE

CERTIFICATE OF CORRECTION

PATENT NO. : 6,025,017
DATED : February 15, 2000
INVENTOR(S) : Joseph D. Roth

It is certified that error appears in the above-indentified patent and that said Letters Patent is hereby corrected as shown below:

Column 22, Line 24, after ";", insert -- and --.

Column 23, Line 10, before "at", insert -- a) --.

Column 23, Line 17, before "at", insert -- b) --.

Column 23, Line 21, before "at", insert -- c) --.

Column 24, Line 2, before "at", insert -- a) --.

Column 24, Line 9, before "at", insert -- b) --.

Column 24, Line 13, before "at", insert -- c) --.

Signed and Sealed this

Twenty-seventh Day of March, 2001

*Attest:*

Nicholas P. Godici

NICHOLAS P. GODICI

*Attesting Officer*

*Acting Director of the United States Patent and Trademark Office*